(12) United States Patent
Mangin et al.

(10) Patent No.: US 8,155,108 B2
(45) Date of Patent: Apr. 10, 2012

(54) IN-LINE CONTENT ANALYSIS OF A TCP SEGMENT STREAM

(75) Inventors: Christophe Mangin, L'Hermitage (FR); Romain Rollet, Rennes (FR); David Mentre, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 609 days.

(21) Appl. No.: 11/761,090

(22) Filed: Jun. 11, 2007

(65) Prior Publication Data

US 2007/0291662 A1 Dec. 20, 2007

(30) Foreign Application Priority Data

Jun. 12, 2006 (EP) .................................... 06290954

(51) Int. Cl.
*H04L 12/28* (2006.01)
(52) U.S. Cl. ..................................................... 370/351
(58) Field of Classification Search .................. 370/238, 370/351, 389, 395.52, 464, 474; 726/2, 22–25
See application file for complete search history.

(56) References Cited

U.S. PATENT DOCUMENTS

| | | | |
|---|---|---|---|
| 7,058,974 B1 | 6/2006 | Maher, III et al. | |
| 7,114,181 B2 * | 9/2006 | Ramaiah et al. | 726/22 |
| 7,171,440 B2 * | 1/2007 | Hanner | 709/201 |
| 7,257,840 B2 * | 8/2007 | Ramaiah et al. | 726/22 |
| 7,826,457 B2 * | 11/2010 | Bennett et al. | 370/394 |
| 2005/0097358 A1 | 5/2005 | Yanovsky | |
| 2007/0180533 A1 * | 8/2007 | Ramaiah et al. | 726/26 |
| 2007/0226362 A1 * | 9/2007 | Johnson et al. | 709/230 |
| 2008/0256247 A1 * | 10/2008 | Mangin et al. | 709/228 |

FOREIGN PATENT DOCUMENTS

WO WO 2005/099214 A1 10/2005

OTHER PUBLICATIONS

Sarang Dharmapurikar, et al.. "Robust TCP Stream Reassembly in the Presence of Adversaries", XP002402073, 16 pages.
G. Robert Malan, et al., "Transport and Application Protocol Scrubbing", IEEE INFOCOM 2000, pp. 1381-1390.
Umesh Shankar, et al., "Active Mapping: Resisting NIDS Evasion Without Altering Traffic", Proceedings of the 2003 IEEE Symposium on Security and Privacy, pp. 1-18.

* cited by examiner

*Primary Examiner* — Dmitry H Levitan
(74) *Attorney, Agent, or Firm* — Oblon, Spivak, McClelland, Maier & Neustadt, L.L.P.

(57) ABSTRACT

A method for submitting a TCP segment stream to a in-line content analysis comprises: receiving from a TCP emitter a first TCP data segments stream corresponding to a given TCP connection between the TCP emitter and a TCP receiver; extracting and re-assembling a first byte stream from the TCP segment stream; passing a second byte stream, which is derived from the first byte stream, to a content analyser (200) adapted to perform a content analysis on the second byte stream; relaying to the TCP receiver a second TCP data segment stream with a byte stream content totally consistent with the byte stream passed to the content analyser. In order to keep the device (100) that implements the method as stealthy as possible, the second TCP data segment stream has the same number of data segments as the first TCP data segment stream, all segments in the second TCP data segment stream being of same size and having the same header as corresponding segments in the first TCP data segment stream.

19 Claims, 2 Drawing Sheets

IN-LINE CONTENT ANALYSIS OF A TCP SEGMENT STREAM

FIELD OF THE INVENTION

The present invention generally relates to data transmission networks, such as Internet. More specifically, it relates to equipments for performing a cut-through, i.e., in-line byte stream analysis. Such analysis may be conducted for the detection of attacks perpetrated at the application level, i.e., above the transmission level.

Transmission Control Protocol ("TCP") is one of the foundational protocols of the Internet, as defined in Internet Engineering Task Force (IETF) Request for Comments (RFC) 793.

It is an essential feature of TCP to tolerate out-of-order segments (sent later, arriving earlier), that need to be re-assembled into the proper order before they are passed to applications at logical layers above TCP. Therefore typical implementations of TCP provide that a receiver of data maintains out-of-order data in a re-assembly buffer pending receipt of any missing segments. The receiver sends an acknowledgment ("ACK") message for each segment that is received out-of-order and indicating the last validly received sequence number (SeqNo). On the sender side, non-acknowledged segments are hold in a re-transmission buffer. This process enables a sender to rapidly re-transmit segments that have been lost in transmission, because such segments are not acknowledged.

BACKGROUND OF THE INVENTION

Modern data transmission systems are subject to increasingly sophisticated attacks, such as for instance attacks of the data injection type. The principle of such attacks is the following. A genuine data packet is sent with however a checksum parameter which has been so altered as to have a wrong value, whereby the data packet is held valid but is nevertheless discarded on the receiver side. Then a second packet is sent, which has the same packet number, i.e., the same sequence number from the viewpoint of the TCP protocol, but a corrupted payload. This second packet may thus circumvent the protection schemes that are provided at the egress of the network.

Many efforts have been made to prevent or at least limit damages from an adversary, that have let to such answers as those known as IDS ("Intrusion Detection Systems") or IPS ("Intrusion Prevention Systems"). Intrusion Detection Systems are of purely passive form, in the sense that they can only alert the receiver of the presence of malicious activity, whereas Intrusion Prevention Systems operate in-line (i.e., cut-through), that is to say analyse network traffic mid-stream.

From the article "Robust TCP Stream Reassembly In the Presence of Adversaries", by Sarang Dharmapurikar and Vern Paxson, Proceedings of the 14$^{th}$ USENIX Security Symposium, August 2005, pp. 65-80, there is known a hardware-based high-speed TCP reassembly mechanism that is robust against attacks it is targeted at. This mechanism is intended to serve as a module used to construct a variety of network analysis systems, especially Intrusion Prevention Systems.

SUMMARY OF THE INVENTION

An aim of the present invention is to further enhance the resilience to attacks of an in-line content analyser, by rendering the device more stealthy.

The aim of the invention is provide a method and device to feed a TCP byte stream analyser that can check the content of TCP byte streams before they are reconstructed at their destination.

According to a first aspect of the present invention, there is thus proposed a method for submitting at least one TCP data segment stream to a in-line content analysis, the method comprising:

receiving from a TCP emitter a first TCP data segments stream corresponding to a given TCP connection between the TCP emitter and a TCP receiver;

extracting and re-assembling a first byte stream from the TCP segment stream;

passing a second byte stream, which is derived from the first byte stream, to a content analyser adapted to perform a content analysis on said second byte stream; and, relaying to the TCP receiver a second TCP data segment stream with a byte stream content totally consistent with the byte stream passed to the content analyser.

According to embodiments of the invention, the second TCP data segment stream has the same number of data segments as the first TCP data segment stream, all segments in the second TCP data segment stream being of same size and having the same header as corresponding segments in the first TCP data segment stream.

A second aspect of the present invention relates to a device for submitting at least one TCP segment stream to a in-line content analysis, comprising means for implementing a method according to the first aspect.

A third aspect of the present invention is directed to a computer-readable medium carrying one or more sequences of instructions for implementing a method according to the first aspect.

Finally, a fourth aspect of the present invention relates to a computer program product comprising one or more stored sequences of instructions that are accessible to a processor and which, when executed by the processor, cause the processor to implement a method according to the first aspect.

It should be noted that, unlike a conventional TCP re-assembler, the device according to embodiments of the present invention forwards to the receiver the same number of data segments, each being of same size and having the same header as those segments received from the emitter. The only possible changes to the forwarded segments relate to their content, whenever newly received packet data overlaps with already-received data.

BRIEF DESCRIPTION OF THE DRAWINGS

The present invention is illustrated by way of example, and not by way of limitation, in the figures of the accompanying drawings in which like reference numerals refer to similar elements and in which.

DESCRIPTION OF PREFERRED EMBODIMENTS

The description that follows is intended at defining the main architectural principles of a in-line device, hereinafter called a "TCP snooper" or "snooper", that is adapted to submit TCP byte streams to a content analysis, for instance for the detection of attack perpetrated at the application level, i.e. above TCP.

An in-line byte stream analysis operates between the end-points of the TCP connections. Each TCP connection is defined by the following quadruplet: IP address of the transmitter, TCP port number of the transmitter, IP address of the receiver, TCP port number of the receiver.

The snooper is designed so that it has the least impact on the observed traffic, i.e. is as stealthy as possible, and, further, is resilient to attacks it may be targeted at.

Information to be analysed and application to be protected reside in upper network layers, i.e. above layer 4 (or transport layer) of the stack of layers of the ISO model ("International Standardization Organization"). Retrieving information from layer 4 has a cost especially when TCP is involved. The idea underlying embodiments of the present invention is thus to decouple up-to-layer-4 processing from above-layer-4 processing. In the following, up-to-layer-4 part of the internet protocol stacks is referred to as the data plane whereas the above-layer-4 part is called the application plane.

Attacks can be carried out in both planes and the protection of services necessitates traffic analysis and sanitation across these two planes. An efficient and robust data plane processing must then be implemented that provide not only resilience to the attacks it is targeted at, but also a reliable source for application plane processing.

The equipment may be located at the ingress or egress points of a network so that all traffic of any given TCP connection can be observed. Two types of interventions can be possibly done: sanitizing of all the traffic entering a network (at the ingress) or protecting a specific service or application (at the egress). The location of the analysis/modification function has an impact on its implementation.

Description of the content analysis as such, and of the manner attacks may be dealt with would however go beyond the scope of the present description. Therefore, the present description will focus on the snooper's implementation and operation.

TCP Re-Assembly

TCP connections to be observed are selected based on specific information such as port numbers and IP addresses. TCP connection establishment and tear-down message exchanges are tracked and their correctness checked in order to perform exact snooping, i.e. be able to have access at the very same data as the one exchanged between both connection ends.

Figure 1:
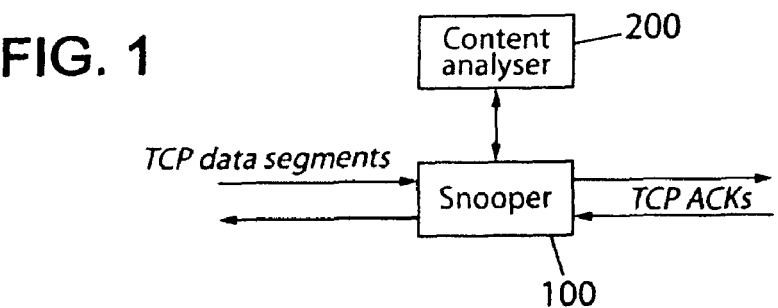
FIG. 1 is a diagram showing the implantation of the TCP snooper in respect of the analysed traffic.

Referring to FIG. 1, the function of the TCP snooper 100 is to feed a TCP byte stream analyser 200 with reconstructed TCP byte streams. The analyser 200 checks the content of the TCP byte streams before they are reconstructed at their destination, and in turn, may decide to react on the TCP segment stream if suspicious content is detected. The TCP byte stream analyser 200 may thus be inserted between the end-points of the TCP connections. The TCP snooper 100 takes as input the data transiting over both directions of TCP connections, i.e. TCP data segments and acknowledgements (TCP ACKs or ACKs).

For the sake of simplicity and brevity, there will be described here the operation of the snooper 100 when processing only one direction of a TCP connection. Stated otherwise, and as illustrated on FIG. 1, it will be considered that the snooper processes only data segments on the one direction (from left to right) and only acknowledgments on the reverse direction (from right to left). In practice, however, the snooper processes both directions of the TCP connection, which means that it processes TCP segments on both direction, and corresponding acknowledgments on both directions as well. Besides, it goes without saying the TCP snooper is designed to handle an important number of TCT connections, for instance, many tens of thousands of TCP connections between the ingress and the egress of a network.

The basic features of the TCP snooper are the following:
- it is as dynamically transparent as possible to the TCP end-to-end behavior,
- the byte stream content provided by the snooper to the content analyser is totally coherent, i.e., consistent with the byte stream content delivered to the receiving end-point.

Dynamic Transparency

For any given TCP connection, the TCP snooper is adapted to not disrupt nor modify the TCP congestion control and error recovery mechanisms implemented in both connection end-points.

The ACK clocking mechanism is not disrupted. For that purpose, the segments received by the snooper are all forwarded with as short a delay as possible and in the same order as they are received. Similarly, the ACKs are forwarded transparently, i.e. as they are received by the snooper and without any significant added delay.

These provisions provide several advantages:
- the snooper is kept as stealthy as possible;
- TCP performance degradation is avoided; and,
- all TCP flavors such as "Tahoe", "Reno" [RFC2581], "New-Reno" [RFC2582] [RFC3782], SACK (Selective ACK) [RFC2018], Limited Transmit [RFC3042], including bogus implementations, are supported or tolerated.

Semantic Coherency

One assumption is made on the receiver behavior: it does not start processing received data as long as they are not re-ordered.

When out-of-order segments are received, i.e. non consecutive segments or re-ordered segments, content analysis is still performed on re-ordered or partially re-ordered data.

Whenever a segment is received that contains data that is overlapping data already stored in the re-assembly buffer (due to retransmission or faulty/malicious implementation), the newly received data is ignored and replaced by the data already present in the snooper's re-assembly buffer. This is achieved by maintaining the re-assembly buffer boundaries in accordance with the receiver's window state as advertised by the receiver (whenever the ACKs are not lost between the receiver and the snooper).

By doing so, the data received by the end-receiver remains consistent with the data provided by the snooper to the analyser.

General Architecture and Principle of Operation

Figure 2:
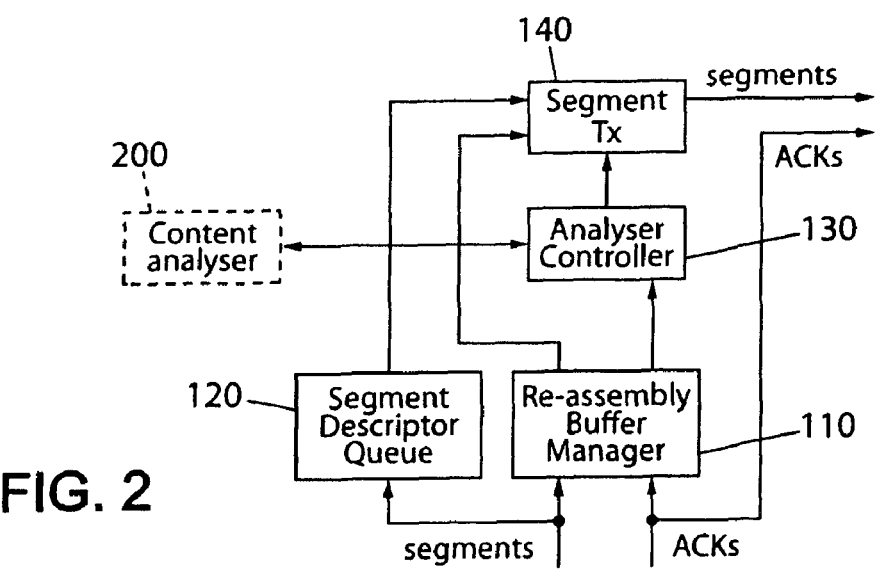
FIG. 2 is block diagram illustrating the snooper architecture.

The block diagram of FIG. 2 illustrates the general architecture and principle of operation of the TCP snooper according to embodiments of the present invention.

Segments and ACKs are used by a re-assembly buffer management unit 110 that exploits the information carried by these packets to maintain a re-assembly buffer on a per TCP connection basis. Received segments also feed a segment descriptor queue 120 that enforces the packet reception order for further relaying. The analyser controller 130 controls the invocation of the content analyser based on the status of the re-assembler buffer manager 110. The analyser controller 130 also manages the relaying of segments by a segment transmission unit 140 based on information provided by the re-assembly buffer manager 110 and the contents analyser 200. The unit 140 receives data from the re-assembly buffer manager 110 and from the segment description queue 120. ACKs that are received by the snooper are forwarded without delay to their receiving end-point.

The operation of the segment descriptor queue 120 is the following. When a segment is received and accepted by the snooper, a descriptor of that segment is created and appended to the corresponding TCP connection's queue. Each TCP connection has a distinct identifier that is derived from the IP addresses and port numbers carried by the segments. A segment descriptor contains the TCP and IP information specific to that segment: the first two 32-bit words of the IP header (IP options are ignored) and the whole TCP header excluding the checksum and port numbers. TCP options cannot be ignored and can amount for up to 44 bytes (the reason for that is a segment may convey both data and a SACK, i.e., a selective ACK, for instance). 64 bytes are enough to fit all that information but the link information may be kept in another structure.

Table 1 given below illustrates the standard IPv4 and TCP headers, whereas Table 2 illustrates a compacted 64-byte segment descriptor as kept in the segment descriptor queue 120.

The following fields initially present in the segment header can be ignored to compress the descriptor:
  IP addresses, since they can be regenerated from the TCP connection identifier;
  IP fragmentation information: de-fragmentation of IP datagrams is performed by a specialised module that delivers de-fragmented packets to the snooper;
  IP TTL, which may be replaced by a carefully chosen arbitrary value when relaying the segment;
  IP protocol, because it is a constant value (considering that IP protocol is TCP);
  IP header checksum, which can be regenerated on the fly when relaying the segment;
  TCP port numbers, which can also be regenerated from the TCP connection identifier; and,
  TCP checksum, which can be regenerated on the fly when relaying the segment.

This descriptor can be used to generate a complete TCP and IPv4 header when relaying the segment. The queue is used to forward the segments in the order of their arrival upon transmission operation. When forwarding a segment, the corresponding descriptor is freed.

Figure 3:
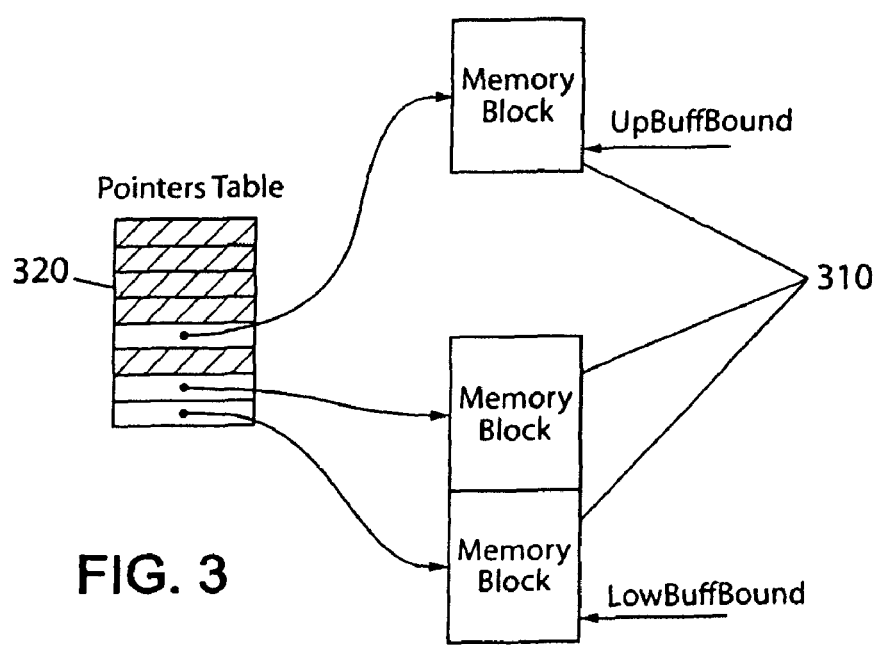
FIG. 3 is a diagram illustrating the re-assembly buffer management.

With reference to FIG. 3, the operation of the re-assembly buffer will now be described in more details.

When a segment is received by the snooper, its payload is inserted in the corresponding connection re-assembly buffer according to its sequence number. The lower boundary of the re-assembly buffer (referred to as LowBuffBound) is maintained by interpreting the ACK sequence number conveyed by the ACKs in the direction opposite to the segments'. It is initially set to the value negotiated during the TCP connection establishment handshake.

The upper boundary of the re-assembly buffer (referred to as UpBuffBound) is the maximum of the current UpBuffBound, and the sum of the window size information and the ACK sequence number carried by the latest received ACK. Considering that the snooper is located downstream of the TCP transmitter, this way of computing UpBuffBound guarantees it is always consistent with the transmitter's.

The re-assembly buffer is made up of a set of up to n individual fixed sized memory block(s) 310. Memory blocks 310 are picked up from a pool of memory blocks that is shared between all TCP connections. A memory block is allocated to a given connection, i.e. inserted in or appended to the connection's re-assembly buffer upon reception of a segment, as follows:
  the sequence number range covered by the segment belongs to the re-assembly buffer sequence number range, i.e. comprised within the range [LowBuffBound, UpBuffBound];
  the sequence number range covered by the segment is not totally included in the sequence number range(s) covered by the memory block(s) already allocated to the connection's re-assembly buffer; and,
  there is at most n−1 memory block already allocated to the connection's re-assembly buffer.

For each connection, an n-entry pointers table 320 is used to maintain pointers to the memory blocks constituting the re-assembly buffer. The pointers table is adapted to cover the whole TCP window. This means that the number of pointers equals the size of the TCP window divided by the size of a memory blocks (said memory blocks being of fixed size). The pointers table is continuous, in respect of the packet sequence numbers.

Upon byte stream and analysis progression, memory blocks are freed and returned to the memory block pool.

TABLE 1

| 31 | | | 16 15 | 0 |
|---|---|---|---|---|
| IP version | IP header length | IP TOS | IP total length | |
| | | IP identification | IP frag info | |
| IP TTL | | IP protocol | IP header checksum | |
| | | IP source address | | |
| | | IP destination address | | |
| | | IP options | | |
| | TCP source port number | | TCP destination port number | |
| | | TCP sequence number | | |
| | | TCP ACK sequence number | | |
| TCP header length | | TCP rsvd + flags | TCP window size | |
| | TCP checksum | | TCP urgent pointer | |
| | | TCP option #1 | | |
| | | TCP option #2 | | |
| | | ... | | |
| | | TCP option #11 | | |

TABLE 2

| 31 | | | 16 15 | 0 |
|---|---|---|---|---|
| IP version | IP header length | IP TOS | IP total length | |
| | | IP identification | TCP urgent pointer | |
| | | TCP sequence number | | |
| | | TCP ACK sequence number | | |
| TCP header length | | TCP rsvd + flags | TCP window size | |
| | | TCP option #1 | | |
| | | TCP option #2 | | |
| | | ... | | |
| | | TCP option #11 | | |

Associated with each re-assembly buffer is data structure that stores information about the holes in the re-assembly buffer. Data surrounding a hole are called edges in the following: upper and, respectively, lower edges have greater, respectively, lower sequence numbers as compared to the hole they surround.

Because the packets are of variable size, memory gaps are formed. Using a pointer table as described above nevertheless allows to manage re-assembly of the received data without the management of chained lists to be necessary.

Figure 4:
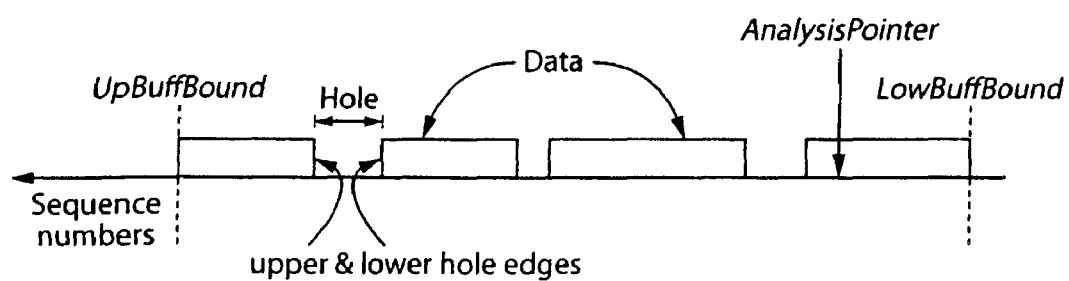
FIG. 4 is a diagram illustrating the re-assembly buffer handling.

FIG. 4 illustrates the re-assembly buffer handling. The re-assembly buffer hole record can be used to determine when data has to be passed to the content analyser, as will be further explained in more details below.

The buffer hole record allows to track up to a given number k of holes per re-assembly buffer, where k is an integer greater than unity. There are three holes represented in FIG. 4, wherein the four rectangles depict the received data, ranked by the sequence numbers, which is stored in the buffer between LowBuffBound and UpBuffBound. The hole which lower edge has the lowest sequence number is called the lowest hole in the following.

The analyser control and packets handling carried out by the snooper will now be described.

Analyser Control

Two policies are possible depending on the bandwidth available for data transfer between the analyser 200 and the snooper 100. If that bandwidth is the same order of magnitude as the network link bandwidth, data is better passed to the analyser as it is received, forcing the analyser to keep a copy of the re-assembly buffer (policy 1). However, if the bandwidth between both entities is much higher than the link's, it is possible to apply another transfer policy that consists in passing only consecutive data, i.e. up to the first encountered hole, to the analyser (policy 2).

In both cases, a pointer (referred to as AnalysisPointer) is maintained that indicates the highest data sequence number passed to the analyser. This pointer is also to be seen on the diagram in FIG. 4 described above.

When applying policy 1, the analyser has the entire responsibility of indicating which segments can be retransmitted once the analysis is performed.

In case policy 2 is applied, when a hole is filled, the hole data and the consecutive data, up to the next hole, is passed to the analyser. There again the bandwidth used for transfers might have to be shared so that a too long data burst does not occupy the link between the analyser and the snooper for too long. A scheduler can be implemented that periodically arbitrate the access to that link.

One or more criteria can be used to schedule the connection whose data is to be sent to the content analyser:
  number of bytes present in re-assembly buffer still not passed to the analyser;
  connection with the oldest stored segment (=first segment waiting for being relayed); or
  connection whose lowest hole above the current value of AnalysisPointer is the most recent over all connections (this criterion favours the connections that fills their holes the quickest: short RTT, effective SACK, not disrupted by adversaries that try to slow down the analysis process by creating long lived holes).

The goal of the scheduling is to modify the connection traffic shape as little as possible, i.e. to be able to analyse data as soon as possible upon their reception, and not favour connections with too much data waiting for analysis.

Once the analysis is performed, the content analyser 200 returns information specifying the sequence number range for which the analysis is complete. The snooper 100 then relays the segments which sequence numbers are strictly included in that range.

Packets Handling

Segment are forwarded based upon sequence number ranges information provided by the analyser 200. They are forwarded in the order their descriptors appear in the segment descriptor queue and if their sequence numbers are included in the sequence number ranges allowed for transmission.

When a segment is forwarded by the snooper, the corresponding segment descriptor is looked up to retrieve the segment's sequence number and length. This information is then used to retrieve the payload from the re-assembly buffer that is then merged with the remaining descriptor information to build the segment's IP and TCP envelops. When walking the descriptor queue, the forwarding process checks that the sequence number of the segment to be relayed is greater than the previous relayed segment. If this is the case, the relaying process continues consuming the queue and relaying the segments provided their sequence numbers are increasing. Whenever a descriptor is found that has a sequence number lower than the previously relayed segment, either one of the two following alternatives is possible:
  the segment belongs to a range already processed by the analyser, then the relaying process continues. In this case the segment is relayed with the corresponding payload read from the re-assembly buffer if the latter is still available. Otherwise, the segment is relayed as it is; or,
  the segment's content (payload) is included in, or includes, a range that has not been analysed, then the relaying process is stopped until it is explicitly triggered again by the content analyser.

By doing this, the relaying process guaranties that the ACK clocking mechanism is not disrupted and that, in particular, the "fast retransmit" algorithm can operate in the TCP transmitter based on the reception of duplicate ACKs (the duplicate ACKs are emitted by the receiver upon reception of segments subsequent to a hole).

Another feature that is thus offered by the relaying mechanism is that the content of all segments leaving the snooper has systematically been analysed or at least stored in the re-assembly buffer.

Segment Reception

Upon reception of a segment, its sequence number is checked against the re-assembly buffer boundaries (LowBuffBound and UpBuffBound). If the segment byte range is within the re-assembly buffer boundaries, a descriptor is created and appended to the descriptors' queue for further forwarding. The re-assembly hole buffer record is possibly updated and the re-assembly buffer is updated with the segment payload.

The segment's payload is inserted in the corresponding connection re-assembly buffer according to its sequence number.

Segments received with sequence numbers greater than the UpBuffBound value are preferably discarded. The reason for this is that a TCP transmitter is allowed to emit new segments only (i) upon reception of ACKs and (ii) if the new segments belong to the window as advertised by the latest ACK (ACK seq num+window size) received by the transmitter. This latter value may be lower than the current UpBuffBound (see the description of the UpBuffBound computation given above).

Segments received by the snooper with sequence numbers lower than LowBuffBound, i.e. with a sequence number lower than the latest received ACK, are preferably forwarded: they should not be processed by the end receiver and most likely, in case ACKs were lost between the snooper and the transmitter, these "below-window" segments will trigger emission of up-to-date ACKs by the receiver. If the bottom boundary of the re-assembly buffer is so that the "below-window" segment payload corresponds to a byte range still stored in the memory block LowBuffBound points to, the segment is forwarded with that payload.

When inserting a payload in the re-assembly buffer, overlapping parts are normalized by keeping the non-overlapping part of the newly received payload, i.e. keeping only the parts of the payload that fill the re-assembly buffer hole(s). Cases where a payload allows to fill several holes are also taken into account.

Figure 5:
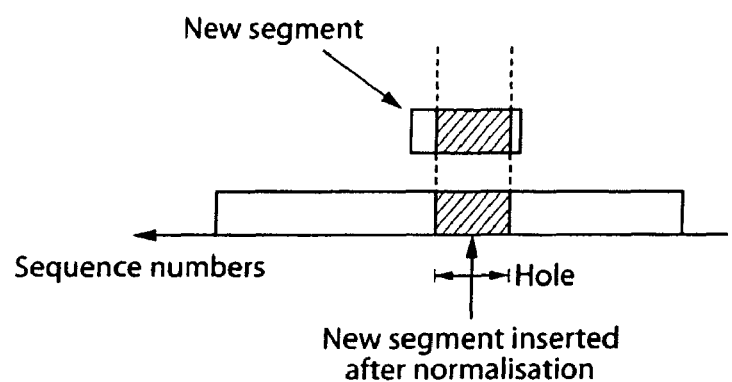
FIG. 5 is a diagram illustrating the segment normalisation and insertion.

This segment normalisation and insertion scheme is illustrated by FIG. 5, in which the part of the payload received in a new segment that fills a hole in the re-assembly buffer is indicated by dashed lines. The remaining part of the payload of the new segment constitutes the overlapping data.

Upon segment reception, operations are performed according to an algorithm described by the following pseudo-code:

```
if seqnum > UpBuffBound
    discard segment
else
    create segment descriptor
    append descriptor to queue
    if LowBuffBound < seqnum < UpBfffBound
        normalise and insert payload in buffer
        update hole record
        if segment fills lowest hole
            invoke analyser
        endif
    endif
endif
```

Acknowledgement Reception

The information exploited by the snooper is the ACK sequence number, i.e. the sequence number of the first byte not yet processed by the end-receiver. The analyser is likely to be more advanced in its processing than the end-receiver. The content analyser maintains a pointer on each hole's lower edge that it requires to be able to perform analysis of the hole data when the latter is eventually received. As an ACK always indicates the sequence number of the first non received segment, which may correspond to a hole, the re-assembly buffer's lower boundary must be defined as the minimum byte sequence number chosen between the ACK sequence number and the pointer on the lower edge of the lowest hole. The latter is referred to as lower analysis boundary (AnalysisPointer).

Upon reception of an ACK, operations are performed which are reflected by the following pseudo-code, being observed that the condition LowBuffBound<AnalysisPointer is always met:

```
if seqnum < LowBuffBound
    do nothing
if AnalysisPointer > seqnum > LowBuffBound
    LowBuffBound = seqnum
```

```
update re-assembly buffer
update hole record
if seqnum > AnalysisPointer
    Indicate to analyser that re-assembly
    buffer is out of synchronisation with
    TCP receiver (ERROR)
```

The present invention can be implemented in hardware, software, or a combination of hardware and software. Any processor, controller, or other apparatus adapted for carrying out the functionality described herein is suitable.

The present invention can also be embedded in a computer program product, which comprises all the features enabling the implementation of the methods described herein, and which—when loaded in an information processing system— is able to carry out these methods. Computer program means or computer program in the present context mean any expression, in any language, code or notation, of a set of instructions intended to cause a system having an information processing capability to perform a particular function either directly or after either or both of the following a) conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

The invention claimed is:

1. A method for submitting a TCP data segment stream to an in-line content analysis, said method comprising:
   receiving from a TCP emitter a first TCP data segment stream from an established TCP connection between the TCP emitter and a TCP receiver;
   extracting and re-assembling in a reassembly buffer a first byte stream from the first TCP data segment stream to reinforce a packet order based on a sequence number range;
   passing a second byte stream, which is derived from the first byte stream, to a content analyser to perform a content analysis on said second byte stream;
   relaying to the TCP receiver a second TCP data segment stream with a byte stream content that is coherent with the second byte stream passed to the content analyser, by maintaining boundaries of the reassembly buffer for the first byte stream in accordance with the sequence number range, wherein segments in the second TCP data segment stream have the same size and the same header as corresponding segments in the first TCP data segment stream, and the relaying of the second TCP data segment stream is based on the sequence number range already processed by the content analyser and the sequence numbers of the first byte stream.

2. Method according to claim 1, wherein acknowledgment segments, or ACKs, received from the TCP receiver are forwarded to the TCP emitter as they are received and without any delay.

3. Method according to claim 1, wherein received data segments and ACKs are used to maintain the re-assembly buffer on a per TCP connection basis, and wherein received data segments further feed a data segment descriptor queue that enforces the data segment reception order for further relaying.

4. Method according to claim 3, wherein the sequence number range includes a lower and an upper boundary, and received data segments having a sequence number which is lower than the lower boundary of the re-assembly buffer are relayed as part of the second TCP data segments stream, and received data segments having a sequence number which is greater than the upper boundary of the re-assembly buffer are discarded.

5. Method according claim 3, wherein, whenever a data segment is received that contains data that is overlapping data already stored in the re-assembly buffer, the newly received data is ignored and replaced in the second byte stream by the data already present in the re-assembly buffer.

6. Method according to claim 3, wherein a data segment descriptor contains TCP and IP information specific to that data segment and that is used to generate a TCP header when relaying the data segment as part of the second TCP data segment stream.

7. Method according to claim 3, wherein received data segments are relayed as part of the second TCP data segments stream in the order their respective data segment descriptors appear in the data segment descriptor queue.

8. Method according to claim 7, further comprising a step of:

checking, when walking the data segment descriptor queue, whether the sequence number of a current data segment to be relayed is greater than the sequence number of a previously relayed data segment, wherein, whenever a data segment descriptor is found that has a sequence number lower than the sequence number of the previously relayed segment:

the current data segment is relayed if content of the current data segment belongs to a sequence number range already processed by the content analyser; or the relaying process of the current data segment is stopped until the relaying process is triggered again by the content analyser.

9. Method according to claim 3, wherein the re-assembly buffer has a number n of individual fixed sized memory blocks, which are picked up from a pool of memory blocks that is shared between all TCP connections, where n is an integer greater than unity.

10. Method according to claim 9, further comprising a step of:

allocating a memory block by inserting or appending the memory block to the re-assembly buffer upon reception of a segment, wherein the sequence number range covered by the segment belongs to the re-assembly buffer sequence number range;

the sequence number range covered by the segment is not totally included in the sequence number range(s) covered by the memory block(s) already allocated to the connection's re-assembly buffer; and there is at most n−1 memory block already allocated to the connection's re-assembly buffer.

11. Method according to claim 9, wherein for each connection, an n-entry pointers table is used to maintain pointers to the memory blocks constituting the re-assembly buffer.

12. Method according claim 3, wherein a data structure is associated with each re-assembly buffer that stores information about holes in the re-assembly buffer.

13. Method according to claim 12, wherein only consecutive data is passed to the content analyser, which is data up to the first encountered hole.

14. Method according to claim 13 wherein, when a hole is filled, the hole data and the consecutive data, up to the next hole, is passed to the analyser.

15. Method according to claim 3, wherein criteria used to schedule the connection whose data is to be sent to the content analyser include at least one of the number of bytes present in the re-assembly buffer still not passed to the analyser;

the oldest stored segment over all connections; and the fact that the closest hole above the current value of a pointer indicating the highest data sequence number passed to the analyser is the most recent over all connections.

16. Method according to claim 1, wherein a pointer is maintained that indicates the highest data sequence number passed to the analyser.

17. A system for processing a TCP data segment stream, comprising:

means for receiving from a TCP emitter a first TCP data segment stream from an established TCP connection between the TCP emitter and a TCP receiver;

means for extracting and re-assembling in a reassembly buffer a first byte stream from the first TCP data segment stream to reinforce a packet order based on a sequence number range;

means for passing a second byte stream, which is derived from the first byte stream, to a content analyser to perform a content analysis on said second byte stream;

means for relaying to the TCP receiver a second TCP data segment stream with a byte stream content that is coherent with the byte stream passed to the content analyser, by maintaining boundaries of the reassembly buffer for the first byte stream in accordance with the sequence number range, wherein segments in the second TCP data segment stream have the same size and the same header as corresponding segments in the first TCP data segment stream, and the second TCP data segment stream is relayed based on the sequence number range already processed by the content analyser and the sequence numbers of the first byte stream.

18. A non-transitory computer readable medium having computer instructions recorded thereon, the instructions configured to cause the computer to perform a method when executed on the computer, the method comprising the steps of:

receiving from a TCP emitter a first TCP data segment stream from an established TCP connection between the TCP emitter and a TCP receiver;

extracting and re-assembling in a reassembly buffer a first byte stream from the first TCP data segment stream to reinforce a packet order based on a sequence number range;

passing a second byte stream, which is derived from the first byte stream, to a content analyser to perform a content analysis on said second byte stream;

relaying to the TCP receiver a second TCP data segment stream with a byte stream content that is coherent with the byte stream passed to the content analyser, by maintaining boundaries of the reassembly buffer for the first byte stream in accordance with the sequence number range, wherein segments in the second TCP data segment stream have the same size and the same header as corresponding segments in the first TCP data segment stream, and the relaying of the second TCP data segment stream is based on the sequence number range already processed by the content analyser and the sequence numbers of the first byte stream.

19. A system for processing a TCP data segment stream, comprising:

a network interface configured to receive from a TCP emitter a first TCP data segment stream from an established TCP connection between the TCP emitter and a TCP receiver;

a re-assembler buffer manager configured to extract and re-assemble in a reassembly buffer a first byte stream from the first TCP data segment stream to reinforce a packet order based on a sequence number range;

an analyzer controller configured to pass a second byte stream, which is derived from the first byte stream, to a content analyser to perform a content analysis on said second byte stream;

a segment transmission unit configured to relay to the TCP receiver a second TCP data segment stream with a byte stream content that is coherent with the byte stream passed to the content analyser, by maintaining boundaries of the reassembly buffer for the first byte stream in accordance with the sequence number range, wherein segments in the second TCP data segment stream have the same size and the same header as corresponding segments in the first TCP data segment stream, and the second TCP data segment stream is relayed based on the sequence number range already processed by the content analyser and the sequence numbers of the first byte stream.

* * * * *